(12) United States Patent
Stratton et al.

(10) Patent No.: US 10,053,994 B2
(45) Date of Patent: Aug. 21, 2018

(54) ABRASIVE SHEATHING

(71) Applicant: UNITED TECHNOLOGIES CORPORATION, Farmington, CT (US)

(72) Inventors: Eric W. Stratton, Mansfield, TX (US); Michael J. Minor, Arlington, TX (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 143 days.

(21) Appl. No.: 14/611,347

(22) Filed: Feb. 2, 2015

(65) Prior Publication Data

US 2017/0044911 A1 Feb. 16, 2017

Related U.S. Application Data

(60) Provisional application No. 61/987,903, filed on May 2, 2014.

(51) Int. Cl.
| | |
|---|---|
| *B24D 3/00* | (2006.01) |
| *F01D 5/28* | (2006.01) |
| *B23K 1/00* | (2006.01) |
| *B23K 35/32* | (2006.01) |
| *B23K 35/00* | (2006.01) |
| *F01D 5/20* | (2006.01) |
| *B24D 3/06* | (2006.01) |
| *B24D 3/02* | (2006.01) |
| *B24D 11/00* | (2006.01) |
| *C09K 3/14* | (2006.01) |
| *B24D 18/00* | (2006.01) |

(Continued)

(52) U.S. Cl.
CPC ............ *F01D 5/288* (2013.01); *B23K 1/0018* (2013.01); *B23K 35/004* (2013.01); *B23K 35/327* (2013.01); *B24D 3/06* (2013.01); *F01D 5/20* (2013.01); *B23K 2201/001* (2013.01); *F01D 11/122* (2013.01); *F05D 2220/32* (2013.01); *F05D 2230/40* (2013.01); *F05D 2240/307* (2013.01); *F05D 2300/11* (2013.01); *F05D 2300/177* (2013.01)

(58) Field of Classification Search
USPC .......................................... 51/307, 293, 309
See application file for complete search history.

(56) References Cited

U.S. PATENT DOCUMENTS

| | | | |
|---|---|---|---|
| 5,074,970 A | 12/1991 | Routsis et al. | |
| 2004/0091627 A1* | 5/2004 | Ohara | B23K 1/0018 427/402 |
| 2010/0150730 A1* | 6/2010 | Sellars | F01D 11/122 416/241 R |

FOREIGN PATENT DOCUMENTS

| | | |
|---|---|---|
| EP | 1391537 A1 | 2/2004 |
| WO | WO 2009/083000 A1 | 7/2009 |

OTHER PUBLICATIONS

European Search Report Application No. 15166117 dated Aug. 31, 2015.

* cited by examiner

*Primary Examiner* — James E McDonough
(74) *Attorney, Agent, or Firm* — Cantor Colburn LLP

(57) ABSTRACT

An abrasive sheath for application to a component surface is disclosed. The abrasive sheath may comprise a metallic layer and an abrasive layer plated on a surface of the metallic layer. The abrasive layer may include a metal matrix and abrasive particles protruding from the matrix. An exposed (Continued)

surface of the metallic layer of the abrasive sheath may be joinable to the component surface by a heat treatment.

19 Claims, 2 Drawing Sheets

(51) Int. Cl.
*B23K 101/00* (2006.01)
*F01D 11/12* (2006.01)

ABRASIVE SHEATHING

CROSS REFERENCE TO RELATED APPLICATION

This application claims priority under 35 USC § 119(e) to U.S. Provisional Patent Application Ser. No. 61/987,903 filed on May 2, 2014.

FIELD OF THE DISCLOSURE

The present disclosure generally relates to abrasive sheaths, and more specifically, relates to abrasive sheaths for application to various component surfaces, such as the tips of turbine blades in a gas turbine engine.

BACKGROUND

In situations where the surfaces of metallic components engage and grind against one another, one or more of the contacting surfaces may be coated with an abrasive layer containing abrasive particles. The abrasive layer may act to protect the contacting surface of the component from wear, while enhancing the cutting/grinding strength of the component. For example, certain cutting instruments or grinding tools used in machining applications may have a cutting/grinding surface coated with such an abrasive layer. Similarly, the tips of rotating airfoils in gas turbine engines may be protected with an abrasive layer that wears away a surrounding abradable structure as the airfoil rotates. For instance, abrasive layers on the tips of turbine blades may wear away an abradable airseal lining a surrounding shroud as the turbine blade rotates to create a close-tolerance seal that prevents gas leakage, while also protecting the turbine blade tips from damage caused by the abrasion.

Current approaches to apply abrasive layers on gas turbine engine components, such as airfoils, frequently rely on electroplating methods to deposit the abrasive layers on desired part surfaces. The electroplating method may generally involve: 1) masking any surfaces of the part that are to remain uncoated, 2) placing the masked part in a plating bath containing dissolved metal ions, abrasive particles, and a metal anode, 3) applying a current to cause reduced metal(s) and abrasive particles to deposit on the unmasked surface of the part, and 4) unmasking the part. For example, U.S. Pat. No. 5,074,970 discloses the use of entrapment electroplating to co-deposit a nickel layer and abrasive particles on the tips of compressor airfoils. In this approach, the tip of the airfoil is submerged in a nickel plating solution containing a slurry of abrasive particles, and the deposition of a nickel layer on the airfoil tip causes the entrapment of any abrasive particles in contact with the tip in the nickel layer. As another example, U.S. Patent Application Publication Number 2010/0150730 describes the use of an electroplating method to apply an abrasive layer on the tips of turbine airfoils. While effective, the application of abrasive layers on component surfaces by electroplating may be limited by the size or structural features of the targeted surface due to line of site or current density issues. Moreover, electroplating may require relatively expensive equipment, particularly for plating applications on larger industrial parts, such as gas turbine engine parts. Even further, electroplating techniques may become complicated or cumbersome when dealing with larger parts and/or when complex masking/unmasking steps are required.

Clearly, there is a need for more efficient approaches for applying abrasive layers to component surfaces.

SUMMARY OF THE DISCLOSURE

In accordance with one aspect of the present disclosure, an abrasive sheath for attachment to a component surface is disclosed. The abrasive sheath may comprise a metallic layer and an abrasive layer plated on a surface of the metallic layer. The abrasive layer may include a matrix and abrasive particles protruding from the matrix. An exposed surface of the metallic layer may be joinable to the component surface by a heat treatment.

In another refinement, the component surface may be metallic.

In another refinement, the abrasive particles may consist of particles of cubic boron nitride.

In another refinement, the matrix may comprise an alloy having the formula MCrAlY, where M is selected from group consisting of Ni, Co, Fe, and combinations thereof.

In another refinement, the metallic layer may consist of nickel foil.

In another refinement, the heat treatment may comprise welding.

In another refinement, the metallic layer may consist of nickel braze foil.

In another refinement, the heat treatment may comprise brazing.

In another refinement, the component surface may be a tip of a turbine blade of a gas turbine engine.

In another refinement, the component surface may be a cutting surface of a cutting tool.

In accordance with another aspect of the present disclosure, a method for attaching an abrasive sheath to a component surface is disclosed. The method may comprise providing the abrasive sheath, wherein the abrasive sheath includes a metallic layer and an abrasive layer plated on a surface of the metallic layer. The method may further comprise placing an exposed surface of the metallic layer in contact with the component surface, and attaching the abrasive sheath to the component surface by a heat treatment.

In another refinement, the abrasive layer may include a matrix and abrasive particles protruding from the matrix.

In another refinement, the abrasive particles may comprise particles of cubic boron nitride, and the matrix may comprise an alloy having the formula MCrAlY, where M is selected from the group consisting of Ni, Co, Fe, and combinations thereof.

In another refinement, the method may further comprise shaping the abrasive sheath to cause the abrasive sheath to conform to a shape of the component surface, prior to attaching the abrasive sheath to the component surface by the heat treatment.

In another refinement, the metallic layer may consist of nickel foil.

In another refinement, attaching the abrasive sheath to the component surface by the heat treatment may comprise welding the metallic layer to the component surface.

In another refinement, the metallic layer may consist of nickel braze foil.

In another refinement, attaching the abrasive sheath to the component surface by the heat treatment may comprise brazing the metallic layer to the surface.

In accordance with another aspect of the present disclosure, a component having a surface covered with an abrasive sheath is disclosed. The component may be fabricated by a method comprising: 1) providing a metallic layer, 2) plating an abrasive layer on a surface of the metallic layer to provide the abrasive sheath, wherein the abrasive layer includes a matrix and abrasive particles protruding from the matrix, 3) placing an exposed surface of the metallic layer in contact with the surface of the component, and 4) attaching the abrasive sheath to the surface of the component by a heat treatment.

In another refinement, the abrasive particles may comprise particles of cubic boron nitride, and the matrix may comprise an alloy having the formula MCrAlY, where M is selected from the group consisting of Ni, Co, Fe, and combinations thereof.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with gas turbine engine airfoils. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
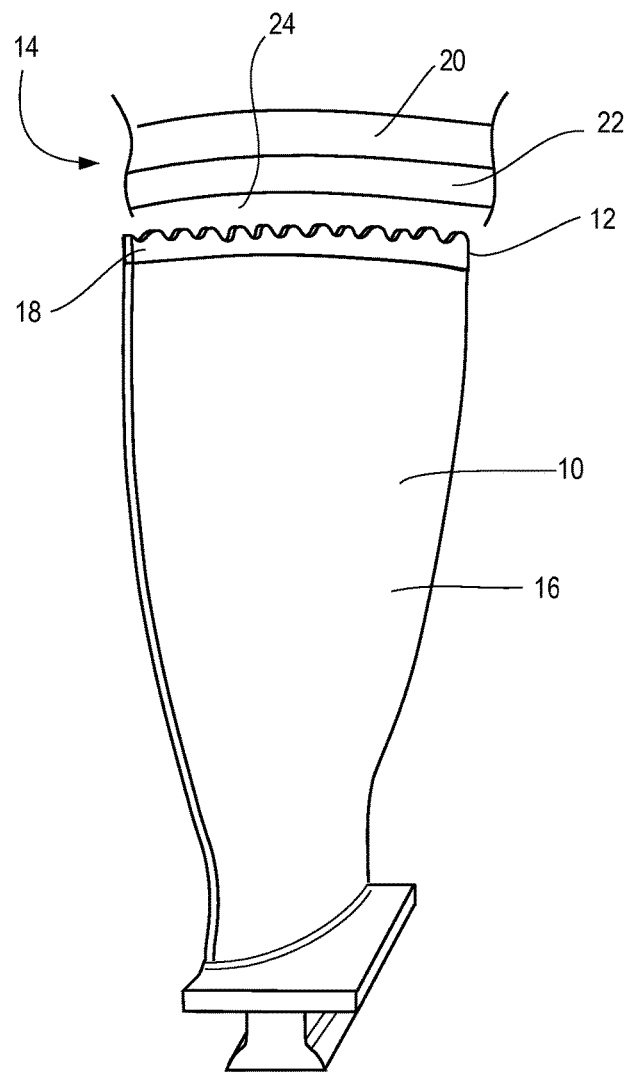
FIG. 1 is a front view of a component having a surface covered with an abrasive sheath, constructed in accordance with the present disclosure.
Figure 3:
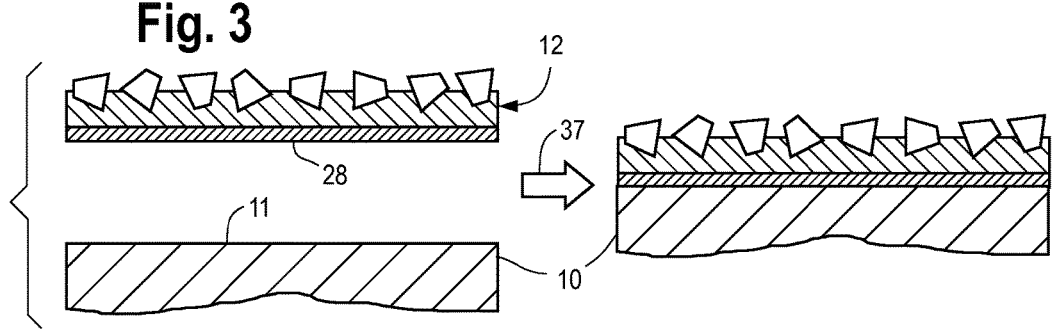
FIG. 3 is a schematic depiction of an attachment of the abrasive sheath to the surface of the component by a heat treatment, in accordance with a method of the present disclosure.

Referring now to the drawings, and with specific reference to FIG. 1, a component 10 having a surface 11 covered with an abrasive sheath 12 is depicted (also see FIG. 3). The surface 11 of the component 10 that is covered with the abrasive sheath 12 may be a surface that is intended to cut, grind against, or otherwise contact an abradable structure 14, and the abrasive sheath 12 may enhance the abrasive properties of the surface 11 and protect it from wear. The component 10 or at least the surface 11 of the component 10 that is covered with the abrasive sheath 12 may be formed from a metallic material such as a pure metal or a metal alloy, and the abradable structure 14 may be formed from a metallic material or a nonmetallic material. Accordingly, the grinding interface between the component 10 and the abradable structure 14 may be a metal-metal interface or a metal-nonmetal interface.

As one possibility, the component 10 may be an airfoil of a gas turbine engine, such as a turbine blade 16 or a compressor blade. If the component 10 is a turbine blade 16, the surface 11 may be a tip 18 of the blade 16, and the abradable structure 14 may be a shroud 20 that surrounds the tip 18 and forms a part of a turbine casing. At least portions of the inner surface of the shroud 20 may be lined with an airseal 22 that is abraded away or sacrificed upon contact with the rotating tip 18 of the turbine blade 16 to form a tight-tolerance gap 24 or seal that reduces gas leakage through the gas turbine engine. Alternatively, the component 10 may be other rotating members of a gas turbine engine, such as, but not limited to, a rotating air seal. However, the component 10 may have uses outside of gas turbine engine applications as well. For example, the component 10 may be a cutting tool or a grinding tool for various machining applications, in which case the cutting/abrading edge or surface of the tool may be covered with the abrasive sheath 12 to enhance its abrasive properties.

Figure 2:
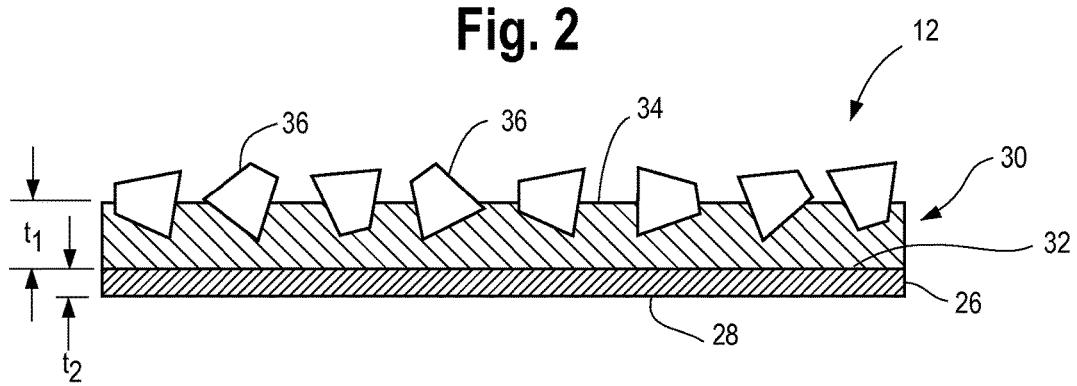
FIG. 2 is a schematic depiction of the abrasive sheath of FIG. 1 shown in isolation.

Turning now to FIG. 2, the abrasive sheath 12 is shown in isolation. It may consist of a metallic layer 26 having an exposed surface 28 configured to join or attach to the surface 11 of the component 10. It may also consist of an abrasive layer 30 deposited on an upper surface 32 of the metallic layer 26 that may be involved in cutting/abrading the abradable structure 14. The metallic layer 26 may be various types of plateable metallic layers that may be cut and formed into desired shapes. For example, the metallic layer 26 may consist of one or more layers of a metallic foil, such as a nickel foil or a nickel braze foil, although other types of metallic foils/layers may also be used.

The abrasive layer 30 may consist of a matrix 34 and abrasive particles 36 that may be at least partially embedded in the matrix 34. In particular, at least some of the abrasive particles 36 may protrude from an exposed surface of the abrasive layer 30 to enhance the abrasive properties of the sheath 12. The matrix 34 may be formed from a metallic material, such as an alloy having the formula MCrAlY, where Cr is chromium, Al is aluminum, Y is yttrium, and M is a metal element or alloy selected from nickel (Ni), cobalt (Co), iron (Fe), or combinations thereof (e.g., Ni/Co, etc.). The abrasive particles 36 may be cubic boron nitride (CBN) particles which have diamond-like structures and cutting properties, or they may be other types of abrasive particles. In some arrangements, the thickness ($t_1$) of the abrasive layer 30 may be greater than the thickness ($t_2$) of the metallic layer 26. For example, the metallic layer 26 may have a thickness ($t_2$) of about 0.001 inches (or about 0.025 mm) and the abrasive layer 30 may have a thickness ($t_1$) of about 0.010 inches (or about 0.25 mm), although other thickness and relative thicknesses are certainly possible.

The abrasive sheath 12 may be manufactured as a sheet-like material that may be cut, formed, and/or affixed to the desired surface 11 of the component 10 as required by an end-user. It may attached to the component 10 during the original manufacture of the component 10, or it may be attached during the repair of the component 10. In any event, the abrasive sheath 12 may be joined or attached to the desired surface 11 of the component 10 by placing the exposed surface 28 of the abrasive sheath 12 in contact with the surface 11 and subjecting the component 10 to a heat treatment 37, as depicted in FIG. 3. The heat treatment 37 may be sufficient to cause diffusion of the metallic materials at the interface between abrasive sheath 12 and the surface 11 to provide a metallic joint therebetween. For example, if the metallic layer 26 of the abrasive sheath 12 is a nickel braze foil, it may be attached to the surface 11 of the component 10 by brazing in which at least a portion of the nickel braze foil may be melted and distributed between the two parts by the heat treatment 37, allowing a joint to be formed between the abrasive sheath 12 and the surface 11 upon solidification. Alternatively, if the metallic layer 26 is a nickel foil, it may be attached to the surface 11 by a welding process, such as tack welding or another type of welding process. In this case, the heat treatment 37 may cause the melting and fusion of metal materials at the interface of the abrasive sheath 12 and the surface 11, and the formation of a joint therebetween upon solidification. In either case, the heat treatment 37 used to attach the abrasive sheath 12 to the surface 11 may be applied by the use of a furnace or by localized heat treatment with a mobile heating device, such as an induction coil or a radiant heating device. As alternative possibilities, the abrasive sheath 12 may be affixed to the desired surface of the component 10 by adhesive bonding or with mechanical fasteners.

The ability to attach the abrasive sheath 12 to the component surface by the heat treatment 37 may improve the relative ease and efficiency of the manufacture or repair of the component 10 compared with prior art systems that rely on electroplating to deposit abrasive layers. For example, the abrasive sheath 12 may be more readily attached to certain component surfaces that are difficult to access by electroplating due to the size or structural features of the surface. In addition, the ability to attach the abrasive sheath 12 by the heat treatment 37 may reduce processing times as well as labor and equipment costs, as the need for component masking and electroplating equipment large enough for large industrial parts (i.e., gas turbine engine parts) may be eliminated in some arrangements.

Figure 4:
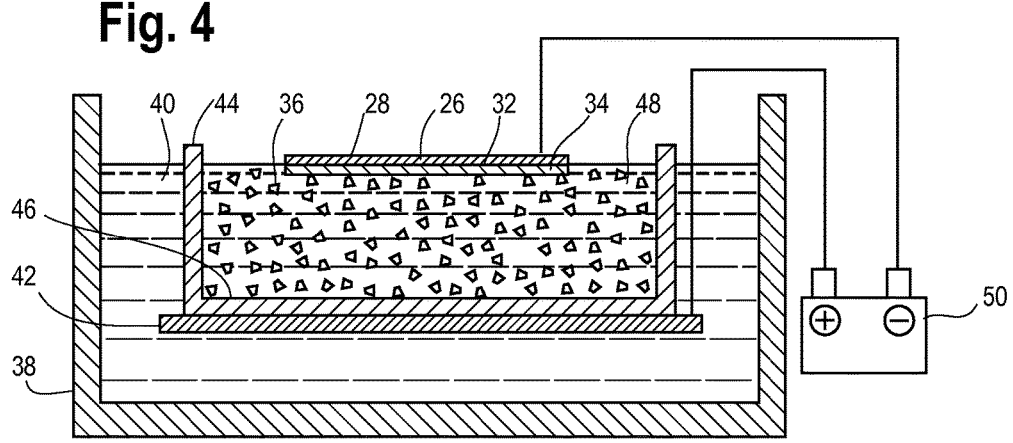
FIG. 4 is a schematic depiction of an entrapment plating process for fabricating the abrasive sheath, in accordance with a method of the present disclosure.

The abrasive sheath 12 may be fabricated by depositing the abrasive layer 30 on the upper surface 32 of the metallic layer 26 by an electroplating process, such as a slurry plating process or an entrapment plating process, as schematically depicted in FIG. 4. The entrapment plating process may be carried out in an electroplating tank 38 containing a plating solution 40, an anode 42, and a plating chamber 44 with a bottom surface 46 that is permeable to the plating solution 40 and electric current. The plating solution 40 may consist of a solution of dissolved metal ions of the desired matrix 34 of the abrasive layer 30, such as MCrAlY ions, and the plating chamber 44 may contain a slurry 48 of the abrasive particles 36 and the plating solution 40. In addition, the metallic layer 26 and the anode 42 may be electrically connected to a power source 50, a shown. During the entrapment plating process, at least the upper surface 32 of the metallic layer 26 may be submerged in the slurry 48 and a current may be supplied by the power source 50, allowing the dissolved metal ions (i.e., the MCrAlY ions) to reduce/plate at the upper surface 32 of the metallic layer 26 to produce the matrix 34. While plating on the upper surface 32, the metals of the matrix 34 may also entrap any abrasive particles 36 that are in contact with the upper surface 32 to ultimately produce the abrasive layer 30. As another possibility, the entrapment plating process may be carried out as described above, except with the surface 28 of the metallic layer 26 masked to prevent deposition of the abrasive layer 30 on the surface 28, such that the metallic layer 26 may be submerged in the slurry 48. It is noted that the schematic of FIG. 4 is merely exemplary, and variations in the electroplating method or instrument set-up that achieve the intended outcome of plating the abrasive layer 30 on the metallic layer 26 are also encompassed by the scope of this disclosure.

Figure 5:
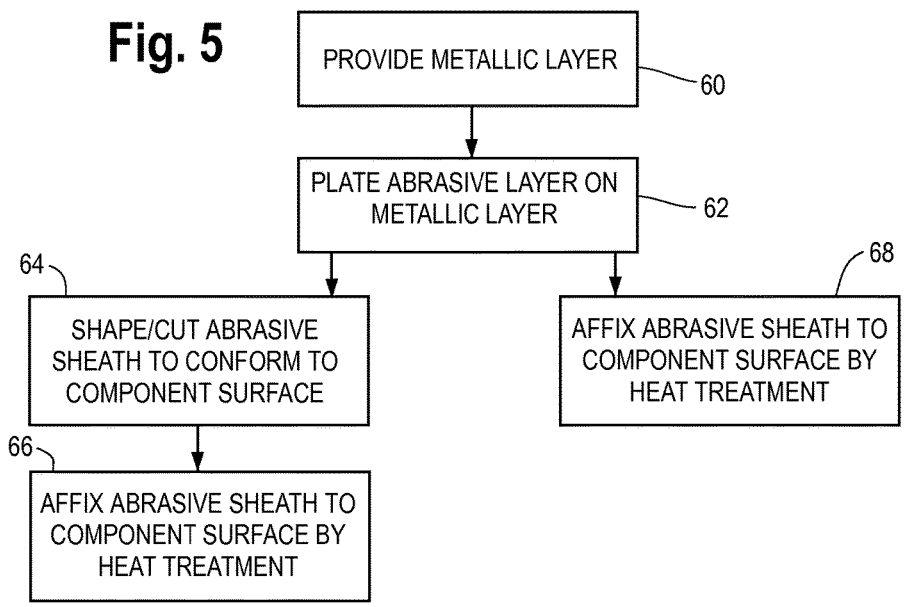
FIG. 5 is a flowchart depicting a series of steps that may be involved fabricating the abrasive sheath and attaching the abrasive sheath to the component, in accordance with a method of the present disclosure.

Referring now to FIG. 5, a series of steps that may be involved in fabricating components having a surface covered with the abrasive sheath 12 are depicted. Beginning with a first block 60, the metallic layer 26 may be provided. For example, the metallic layer 26 may be provided as a commercially available nickel foil or nickel braze foil. According to a next block 62, the abrasive layer 30 may be plated on the upper surface 32 of the metallic layer 26 by an entrapment plating process to provide the abrasive sheath 12, as described in detail above (see FIG. 4). The abrasive sheath 12 may then be shaped and/or trimmed as needed to conform to the contours of the desired surface 11 of the component 10 using forming tools apparent to those skilled in the art, according to a next block 64. For example, if the component 10 is the turbine blade 16, the abrasive sheath 12 may be contoured and/or cut to match the shape of the tip 18 of the blade. Once shaped and/or trimmed appropriately, the exposed surface 28 of the abrasive sheath 12 may then be placed in contact with the surface 11 of the component 10 and affixed thereto by the heat treatment 37, which may be part of a brazing or welding process depending on the composition of the metallic layer 26 (block 66). Alternatively, if shaping or cutting of the abrasive sheath is not required, the exposed surface 28 of the abrasive sheath 12 may be directly affixed to the surface 11 of the component 10 by the heat treatment 37 according to a block 68.

INDUSTRIAL APPLICABILITY

In general, it can therefore be seen that the technology disclosed herein has industrial applicability in a variety of settings including, but not limited to, gas turbine engine applications, machining applications, and tooling applications. The abrasive sheath disclosed herein may exist as a metallic sheet-like material which may be attached as needed to desired surfaces of a component by a heat treatment to create abrasive surfaces at desired locations on the component. In contrast with current approaches which use electroplating to deposit abrasive layers on component surfaces, the strategy of the present disclosure only requires electroplating on a metallic/foil layer, rather than on a surface of an entire part. This distinction may be particularly advantageous for applications on component surfaces in which the size or structural features of the component surface limit the feasibility of directly electroplating an abrasive layer on the part. Moreover, processing times and labor costs may be reduced compared with current electroplating methods, as the heat treatment application method may be performed with greater ease and efficiency than electroplating, and the need for masking/unmasking steps may be eliminated. In addition, the technology disclosed herein may further reduce costs by eliminating the need for electroplating equipment large enough to accommodate large industrial parts, such as gas turbine engine parts. In this regard, the present disclosure facilitates the attachment method relative to electroplating methods, as only forming equipment, heat treatment equipment, and smaller/less complex electroplating equipment capable of depositing on a metallic layer are required. It is expected that the technology disclosed herein may find wide industrial applicability in a wide range of areas such as, but not limited to, aerospace applications and machining applications.

What is claimed is:

1. An abrasive sheath for attachment to a component surface, comprising:
   a metallic layer having a thickness $t_2$; and an abrasive layer having a thickness $t_1$ plated on a surface of the metallic layer and comprising a matrix consisting of a metallic material, and further comprising abrasive particles protruding from the matrix, an exposed surface of the metallic layer being joinable to the component surface by a heat treatment, wherein $t_1$ is greater than $t_2$.

2. The abrasive sheath of claim 1, wherein the component surface is metallic.

3. The abrasive sheath of claim 2, wherein the abrasive particles consist of particles of cubic boron nitride.

4. The abrasive sheath of claim 3, wherein the matrix consists of an alloy having the formula MCrAlY, where M is selected from the group consisting of Ni, Co, Fe, and combinations thereof.

5. The abrasive sheath of claim 4, wherein the metallic layer consists of nickel foil.

6. The abrasive sheath of claim 5, wherein the heat treatment comprises welding.

7. The abrasive sheath of claim 4, wherein the metallic layer consists of nickel braze foil.

8. The abrasive sheath of claim 7, wherein the heat treatment comprises brazing.

9. The abrasive sheath of claim 4, wherein the component surface is a tip of a turbine blade of a gas turbine engine.

10. The abrasive sheath of claim 4, wherein the component surface is a cutting surface of a cutting tool.

11. A method for attaching an abrasive sheath to a component surface, comprising:
providing the abrasive sheath, the abrasive sheath having a metallic layer having a thickness $t_2$ and an abrasive layer having a thickness $t_1$ plated on a surface of the metallic layer, wherein the abrasive layer comprises a matrix, and the abrasive layer further comprises abrasive particles protruding from the matrix, wherein the matrix consists of a metallic material and $t_1$ is greater than $t_2$;
placing an exposed surface of the metallic layer of the abrasive sheath in contact with the component surface; and
attaching the abrasive sheath to the component surface by a heat treatment.

12. The method of claim 11, wherein the abrasive particles comprise particles of cubic boron nitride, and wherein the matrix consists of an alloy having the formula MCrAlY, where M is selected from the group consisting of Ni, Co, Fe, and combinations thereof.

13. The method of claim 11, further comprising shaping the abrasive sheath to cause the abrasive sheath to conform to a shape of the component surface, prior to attaching the abrasive sheath to the component surface by the heat treatment.

14. The method of claim 11, wherein the metallic layer consists of nickel foil.

15. The method of claim 14, wherein attaching the abrasive sheath to the component surface by the heat treatment comprises welding the metallic layer to the component surface.

16. The method of claim 12, wherein the metallic layer consists of nickel braze foil.

17. The method of claim 16, wherein attaching the abrasive sheath to the component surface by the heat treatment comprises brazing the metallic layer to the component surface.

18. A component having a surface covered with an abrasive sheath, the component being fabricated by a method comprising:
providing a metallic layer having a thickness $t_2$;
plating an abrasive layer having a thickness $t_1$ on a surface of the metallic layer to provide the abrasive sheath, the abrasive layer comprising a matrix and abrasive particles protruding from the matrix, wherein the matrix consists of a metallic material and $t_1$ is greater than $t_2$;
placing an exposed surface of the metallic layer in contact with the surface of the component; and
attaching the abrasive sheath to the surface of the component by a heat treatment.

19. The component of claim 18, wherein the abrasive particles comprise particles of cubic boron nitride, and wherein the matrix consists of an alloy having the formula MCrAlY, where M is selected from the group consisting of Ni, Co, Fe, and combinations thereof.

* * * * *